United States Patent
Mohanty et al.

(10) Patent No.: US 8,145,243 B2
(45) Date of Patent: *Mar. 27, 2012

(54) TECHNIQUES FOR LOCATION MANAGEMENT AND PAGING IN A COMMUNICATION SYSTEM

(75) Inventors: Shantidev Mohanty, Hillsboro, OR (US); Muthaiah Venkatachalam, Beaverton, OR (US); Sameer Pareek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1487 days.

This patent is subject to a terminal disclaimer.

(21) Appl. No.: 11/270,765

(22) Filed: Nov. 8, 2005

(65) Prior Publication Data

US 2007/0105567 A1 May 10, 2007

(51) Int. Cl.
*H04W 68/00* (2009.01)
*H04W 4/00* (2009.01)
(52) U.S. Cl. ........................ 455/458; 455/461
(58) Field of Classification Search .................. 455/436, 455/422, 435, 403, 550.1, 561, 458
See application file for complete search history.

(56) References Cited

U.S. PATENT DOCUMENTS

| | | | |
|---|---|---|---|
| 6,697,651 B2 * | 2/2004 | Li | 455/574 |
| 6,707,809 B1 * | 3/2004 | Warrier et al. | 370/351 |
| 6,990,337 B2 * | 1/2006 | O'Neill et al. | 455/422.1 |
| 7,142,520 B1 * | 11/2006 | Haverinen et al. | 370/311 |
| 7,369,522 B1 * | 5/2008 | Soininen et al. | 370/328 |
| 2001/0041571 A1 | 11/2001 | Yuan | |
| 2003/0135626 A1 | 7/2003 | Ray et al. | |
| 2004/0052238 A1 | 3/2004 | Borella et al. | |
| 2005/0073969 A1 * | 4/2005 | Hart et al. | 370/318 |
| 2005/0141464 A1 * | 6/2005 | Willey et al. | 370/337 |
| 2006/0009241 A1 * | 1/2006 | Ryu et al. | 455/458 |
| 2006/0099972 A1 * | 5/2006 | Nair et al. | 455/458 |
| 2006/0099973 A1 * | 5/2006 | Nair et al. | 455/461 |
| 2007/0082683 A1 * | 4/2007 | Na et al. | 455/456.1 |

FOREIGN PATENT DOCUMENTS

| | | | |
|---|---|---|---|
| EP | 1571785 | A2 | 9/2005 |
| EP | 1655985 | A2 | 10/2005 |
| WO | 0105171 | A1 | 1/2001 |
| WO | 0197549 | A1 | 12/2001 |
| WO | 2004070989 | A2 | 1/2004 |
| WO | 2007056515 | A2 | 5/2007 |
| WO | 2007056515 | A3 | 5/2007 |

OTHER PUBLICATIONS

Choi, T. et al., "Combinatorial Mobile IP: A New Efficient Mobility Management Using MinimizedPaging and Local Registration in Mobile IP Enivornment", Wireless Network, 10(3), (May 3, 2004),311-321.

(Continued)

*Primary Examiner* — Yuwen Pan
*Assistant Examiner* — Ayodeji Ayotunde
(74) *Attorney, Agent, or Firm* — Kacvinsky Daisak, PLLC

(57) ABSTRACT

Systems and techniques to manage location management and paging operations for idle mode mobile stations are described. An apparatus may comprise a first foreign agent having a foreign agent idle mode manager to store idle mode information for an idle mobile station in a first paging area of a wireless network. Other embodiments are described and claimed.

18 Claims, 8 Drawing Sheets

OTHER PUBLICATIONS

Perkins, I. C., "Mobile-IP Local Registration with Hierarchical Foreign Agents", IETF Standard-working-draft, (Feb. 22, 1996).
Haverinen, J M., "Mobile ip Regional Paging", IETF Standard-Working-Draft, (Jun. 2000).
Valko, A. G., "Cellular IP: a New Approach to Internet Host Mobility", Computer Communication, 29(1), (Jan. 1999),50-65.
International Search Report and Written Opinion for PCT Application No. PCT/US2006/043632, mailed on Aug. 14, 2007, 23 Pages.
Second Office Action Mailed Apr. 21, 2010, Chinese Patent Application No. 200680037413.0.
Jungje, S., Location Management for supporting IDLE mode in IEEE P802.16e, IEEE C802.16e-04/66r1, 2004, Korea.

* cited by examiner

TECHNIQUES FOR LOCATION MANAGEMENT AND PAGING IN A COMMUNICATION SYSTEM

BACKGROUND

Wireless communication systems exist today to enable electronic devices, e.g., computers, mobile devices, and/or personal communication devices, to communicate and exchange information such as voice and multimedia information (e.g., video, audio and data). The information may be communicated in accordance with a number of different wireless communication protocols, such as the Institute of Electrical and Electronics Engineers (IEEE) standards including the 802.11 standards for Wireless Local Area Networks (WLANs) and the 802.16 standards for Wireless Metropolitan Area Networks (WMANs), for example.

In the context of mobile broadband wireless access (MBWA) systems, wireless communication systems may operate in accordance with protocols and standards that comply with the IEEE 802.16 series of protocols, such as the Worldwide Interoperability for Microwave Access (WiMAX), for example. WiMAX is a wireless broadband technology based on the IEEE 802.16 standard of which IEEE 802.16-2004 and the 802.16e amendment are Physical (PHY) layer specifications. The WiMAX standards-based wireless technology may provide higher-throughput broadband communications over longer distances. WiMAX can be used for a number of applications, including "last mile" wireless broadband connections, hotspots, cellular communications, and high-speed enterprise connectivity for business.

Future wireless communication systems that support broadband wireless access technologies such as the IEEE 802.16 series of standards may need to support and manage the operations of the wireless electronics devices throughout the wireless communication system known in the art as mobile stations. Management may include performing location information update for certain mobile stations, paging mobile stations, delivering data to mobile stations, and so forth. As the number of mobile stations increase, however, so does the complexity and cost of such management operations. Consequently, there may be a need for improvements in managing mobile stations to solve these and other problems.

DETAILED DESCRIPTION

Wireless communication standards include an "idle mode operation" for mobile stations that are not currently involved in active communications. The idle mode operation of mobile stations reduces their battery power consumption. Mobile stations that are in idle mode are tracked by a communications system using paging and location update procedures. The location update may be carried out to update the location of idle mode mobile stations as they move around in a communications system. Paging may be used to, for example, determine the location of a particular idle mode mobile station in a communications system and to deliver voice or data packets destined for that mobile station.

Various embodiments may generally relate to managing location operations in support of paging and data delivery operations for idle mode mobile stations distributed throughout a MBWA system. The MBWA system may be arranged to operate or communicate in accordance with various wireless protocols and standards, such as one or more of the IEEE 802.16 series of protocols (WiMAX), for example. The MBWA system may be deployed with multiple functional entities referred to as foreign agents. The location information of idle mode mobile stations is maintained by one or more paging controllers. The foreign agents may be used to request one or more paging controllers to locate idle mode mobile stations. The location information may be used by one or more paging controllers to perform paging operations for the idle mode mobile stations. The foreign agents may assist the paging controllers to update the location information of the idle mode mobile stations as the idle mode mobile stations move throughout the system. In this manner, the use of foreign agents may reduce the responsibilities of paging controllers in the MBWA system, and therefore the complexity and cost associated with paging operations in general, and paging controllers in particular. Although some embodiments may be described in the context of a MBWA system using one or more WiMAX protocols by way of example, it may be appreciated that other communication protocols may also be used as desired for a given implementation. The embodiments are not limited in this context.

Figure 1:
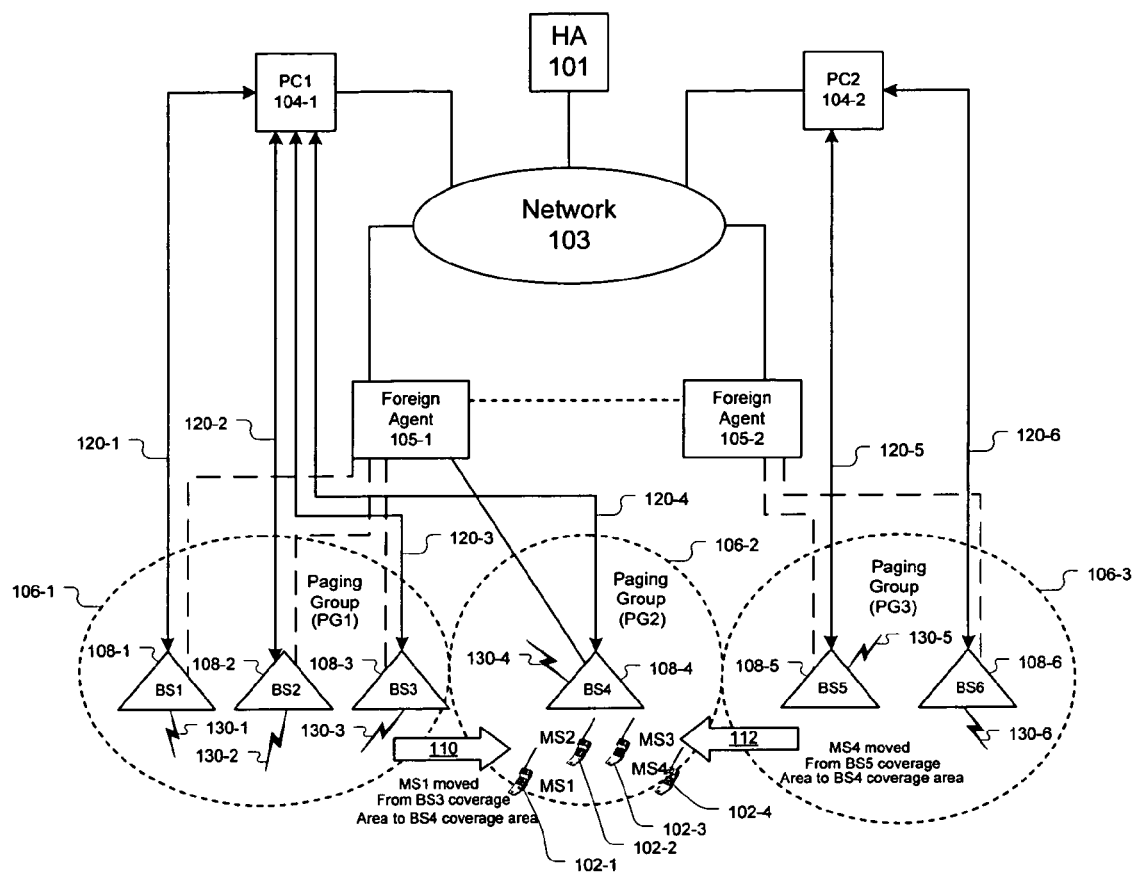
FIG. 1 illustrates one embodiment of a communications system.

FIG. 1 illustrates one embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that additional or fewer nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a mobile station (STA), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the nodes of the communications system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth.

The communications system 100 may communicate information in accordance with one or more standards, such as standards promulgated by the IEEE, the Internet Engineering Task Force (IETF), the International Telecommunications Union (ITU), and so forth. In various embodiments, for example, the communications system 100 may communicate information according to one or more IEEE 802 standards including IEEE 802.11 standards (e.g., 802.11 a, b, g/h, j, n, and variants) for WLANs and/or 802.16 standards (e.g., 802.16a/d/e wireless broadband access systems, 802.16-2004, 802.16.2-2004, 802.16f, and variants) for WMANs. The communications system 100 may communicate information according to one or more of the Digital Video Broadcasting Terrestrial (DVB-T) broadcasting standard and the High performance radio Local Area Network (HiperLAN) standard. The embodiments are not limited in this context.

In various embodiments, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 may include one or more nodes arranged to communicate information over one or more wired and/or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a MBWA network, a WLAN, a WMAN, a wireless wide area network (WWAN), a wireless personal area network (WPAN), an SDMA network, a Code Division Multiple Access (CDMA) network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a Universal Mobile Telecommunications System (UTS) network, a High-Speed Downlink Packet Access (HSDPA) network, a Broadband Radio Access Networks (BRAN) network, a General Packet Radio Service (GPRS) network, a $3^{rd}$ Generation Partnership Project (3GPP) network, a local area network (LAN), a wide area network (WAN), a metropolitan area network (MAN), a Global Positioning System (GPS) network, an Ultra Wide Band (UWB) network, an Internet network, a World Wide Web network, a cellular network, a radio network, a satellite network, and/or any other communications network configured to carry data. The embodiments are not limited in this context.

In various embodiments, the communications system 100 may be arranged to perform data communications using any number of different wireless protocols over various wireless communications media. In one embodiment, for example, various nodes of communications system 100 may be arranged to perform data communications using any number of different data communications systems or techniques, such as GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants), DVB-T, HiperLAN, and others. The embodiments are not limited in this respect.

In various embodiments, the communications system 100 may employ various modulation techniques including, for example: OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. The embodiments are not limited in this context.

The communications system 100 may form part of a multi-carrier system and/or a multiple input multiple output (MIMO) system. A multi-carrier system may use multi-carrier modulations for RF transmissions. A MIMO system is one that uses multiple input and output antennas. In one embodiment, for example, the communications system 100 may comprise a MIMO system arranged to use multi-carrier modulation. For example, the MIMO system may employ one or more multi-carrier communications channels for communicating multi-carrier communication signals. A multi-carrier channel may comprise, for example, a wideband channel comprising multiple sub-channels. The MIMO system may be arranged to communicate one or more spatial data streams using multiple antennas. Examples of an antenna include an internal antenna, an omni-directional antenna, a monopole antenna, a dipole antenna, an end fed antenna, a circularly polarized antenna, a micro-strip antenna, a diversity antenna, a dual antenna, an antenna array, and so forth. Alternatively, the communications system 100 may comprise a multi-carrier system using only a single antenna, such as a single input single output (SISO) system. The embodiments are not limited in this context.

In various embodiments, the communications system 100 may comprise a physical (PHY) layer component for communicating devices either hardware or software based on IEEE standards 802.11n, 802.16-2004, and/or 802.16e, for example. In one embodiment, one or more nodes within the communications system 100 may include a transceiver for a MIMO-OFDM system. The embodiments are not limited in this context.

As shown in FIG. 1, the communications system 100 may be illustrated and described as comprising several separate functional elements, such as modules and/or blocks. In various embodiments, the modules and/or blocks may be connected by one or more communications media. Communications media generally may comprise any medium capable of carrying information signals. For example, communication media may comprise wired communication media, wireless communication media, or a combination of both, as desired for a given implementation.

The modules and/or blocks may comprise, or be implemented as, one or more systems, sub-systems, processors, devices, machines, tools, components, circuits, registers, applications, programs, subroutines, or any combination thereof, as desired for a given set of design or performance constraints. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

In various embodiments, communication system 100 may be implemented as MBWA that operates in accordance with WiMAX wireless broadband technology based on the IEEE 802.16 standard, for example. System 100 may comprise multiple nodes such as a home agent (HA) 101, mobile stations 102-1-m, paging controllers 104-1-n, foreign agents 105-1-q, paging groups 106-1-o, and base stations 108-1-p, where m, n, o, p and q may represent any arbitrary number, all connected via a network 103. Although FIG. 1 illustrates a communications system 100 with a limited number of nodes, it may be appreciated that more or less nodes may be implemented for communication system 100 and still fall within the scope of the embodiments.

In various embodiments, a communications system 100 may include home agent 101. Home agent 101 may be used to implement, for example, one or more protocols to manage network addresses for a network. In one embodiment, for example, home agent 101 may be used to implement mobile Internet Protocol (IP). Mobile IP is an IETF standard communications protocol that is designed to allow mobile device users to move from one network to another while maintaining their permanent IP address. Mobile IP provides techniques for node mobility within the Internet. Using Mobile IP, nodes may change their point-of-attachment to a network such as the Internet without changing their IP address. This allows them to maintain transport and higher-layer connections while moving. Node mobility is realized without the need to propagate host-specific routes throughout the Internet routing fabric.

In general operation, Mobile IP routes packets destined for one or more mobile stations 102-1-m to a home network, or a network identified by the network prefix of the permanent home address for one or more mobile stations 102-1-m. At the home network, home agent 101 may intercept such packets and tunnels them to a most recently reported care-of-address for a mobile station 102-1-m. The care-of-address may correspond to the address of the foreign agent serving the network where the mobile station is currently residing. At the endpoint of the tunnel, the inner packets are decapsulated and delivered to the mobile station 102-1-m. In the reverse direction, packets sent by mobile stations 102-1-m are routed to their destination using standard IP routing techniques.

It may be appreciated that although some embodiments are described using Mobile IP, other similar protocols may be used as desired for a given implementation. For example, the communications system 100 may be modified to use the session initiation protocol (SIP) and others as well. The embodiments are not limited in this context.

In various embodiments, the communications system 100 may include mobile stations 102-1-m. Mobile stations 102-1-m may comprise generalized equipment sets providing connectivity to other wireless devices, such as other mobile devices or fixed devices. Examples for mobile stations 102-1-m may include a computer, server, notebook computer, laptop computer, handheld computer, telephone, cellular telephone, personal digital assistant (PDA), combination cellular telephone and PDA, smartphone, one-way pagers, two-way pagers, handheld video devices, handheld audio devices, handheld multimedia devices, and so forth. In one embodiment, for example, the mobile devices may be implemented as mobile stations (STA) for a WLAN, or mobile subscriber stations (MSS) for a WMAN. Although some embodiments may be described with the mobile devices implemented as a STA or MSS by way of example, it may be appreciated that other embodiments may be implemented using other wireless devices as well. The embodiments are not limited in this context.

In various embodiments, the communications system 100 may include paging controllers 104-1-n. Paging controllers 104-1-n may be employed to perform paging operations for system 100. Paging operations may include sending paging announcement messages to mobile stations 102-1-m. Paging controllers 104-1-n may comprise functional network entities that may be implemented anywhere within system 100. In one embodiment, for example, a paging controller may be implemented as part of an access service network (ASN) gateway. The ASN gateway may include a grouping of various devices arranged to implement various functional network entities. In another example, a paging controller may be co-located with a mobile subscriber center (MSC), a base station or node B, or other network infrastructure equipment. In yet another example, a paging controller may be implemented as a separate network device or entity. The embodiments are not limited in this context.

In various embodiments, the communications system 100 may include one or more foreign agents (FA) 105-1-q. Foreign agents 105-1-q may be arranged to deliver data packets to the mobile stations that are away from their home network. Furthermore, foreign agents 105-1-q may assist in location management operations in support of paging operations as performed by paging controllers 104-1-n for the communications system 100. As with paging controllers 104-1-n, foreign agents 105-1-q may comprise functional network entities that may be implemented anywhere within the communications system 100. In one embodiment, for example, a foreign agent may be implemented as part of an ASN gateway with one or paging controllers. In another example, a foreign agent may be co-located with a MSC, a base station or node B, or other network infrastructure equipment. In yet another example, a foreign agent may be implemented as a separate network device or entity. The embodiments are not limited in this context.

It is worthy to note that the number of paging controllers 104-1-n and foreign agents 105-1-q used for a given implementation may vary. In addition, a communications system 100 may have a different number of paging controllers 104-1-n relative to foreign agents 105-1-q. Furthermore, paging controllers 104-1-n and foreign agents 105-1-q may have different relationships as desired for a given implementation. For example, paging controllers 104-1-n and foreign agents 105-1-q may have a hierarchical or non-hierarchical relationship. In other examples, paging controllers 104-1-n and foreign agents 105-1-q may have a one-to-one correspondence, a one-to-many correspondence, a many-to-many correspondence, and a completely non-deterministic correspondence. The embodiments are not limited in this context.

In various embodiments, a communications system 100 may include paging groups 106-1-o. Paging groups 106-1-o may be a logical unit for paging announcement messages. In one embodiment, for example, paging groups 106-1-o may represent logical groupings of one or more base stations 108-1-p. The geographic area covered by the base station (s) of a particular paging group is referred to as the corresponding paging area. As shown in FIG. 1, the communications system 100 comprises three paging groups 106-1, 106-2, 106-3 and two paging controllers 104-1, 104-2, for example. Paging controller 104-1 manages paging groups 106-1 and 106-2. Paging controller 104-2 manages paging group 106-3. Paging group 106-1 comprises three base stations 108-1, 108-2 and 108-3. Paging group 106-2 comprises one base station 108-4. Paging group 106-3 comprises two base stations 108-5 and 108-6. Base stations 108-1-4 and paging controller 104-1 exchange network backbone messages 120-1-4. Base stations 108-5-6 and paging controller 104-2 exchange network backbone messages 120-5-6. For brevity and illustrative purposes four mobile stations 102-1, 102-2, 102-3 and 102-4 are shown. The embodiments are not limited, however, to the reference example given in FIG. 1.

In various embodiments, a paging controller 104-1-n may perform paging operations by sending or broadcasting a paging announcement message to base stations 108-1-p within a paging group 106-1-o. The paging announcement message may be sent in response to a paging event. Examples of a paging event may include an incoming voice call or data packets, forcing a location update of a mobile station 102-1-m, upon expiration of various system timers, and so forth. The embodiments are not limited in this context.

In various embodiments, the paging announcement message may include a mobile station identifier (MSID) for a given mobile station 102-1-m. The base stations 108-1-p may send or broadcast the paging announcement message to all mobile stations 102-1-m within transmission range of the base stations 108-1-p. When a particular mobile station 102-1-m having the same MSID as contained in the paging announcement message receives the paging announcement message, the receiving mobile station 102-1-m may respond to the paging announcement message.

In various embodiments, the communications system 100 may include various fixed devices, such as base stations 108-1-p. A fixed device may comprise a generalized equipment set providing connectivity, management, and control of another wireless device, such as one or more mobile devices. Examples for a fixed device may include a wireless access point (AP), base station or node B, router, switch, hub, gateway, server, computer, PC, workstation, and so forth. In one embodiment, for example, the fixed device may comprise a base station or node B for a cellular radio telephone system. The fixed device may also provide access to a network, and other nodes accessible via the network (such as a web server). The network may comprise, for example, a packet network such as the Internet, a corporate or enterprise network, a voice network such as the Public Switched Telephone Network (PSTN), and so forth. Although some embodiments may be described with a fixed device implemented as a base station or node B by way of example, it may be appreciated that other embodiments may be implemented using other wireless devices as well. The embodiments are not limited in this context.

In general operation, the communications system 100 may be arranged to perform idle mode operations. Efficient implementation of idle mode operation is a consideration in all mobile networks including future IEEE 802.16 based mobile WiMAX networks. At any given point in time, for example, a statistically larger percentage of mobile stations 102-1-m in the communications system 100 are not engaged in active calls (i.e., active mode) and thus are in idle mode. As a result, there may be a need within the communications system 100 to efficiently track a potentially large population of mobile stations 102-1-m while maintaining their power saving profile (i.e., not requiring the mobile stations 102-1-m to resume active mode). Furthermore, there may be a need to efficiently track mobile stations 102-1-m while conserving valuable air-link resources in performing the tracking activity. Air-link control messages such as paging announcement messages and other control signaling messages generally do not comprise active user-traffic. Therefore, these air-link control messages are non-revenue generating signaling overhead traffic for a network operator. Given a statistically large percentage of mobile stations 102-1-m that may be in idle mode, reducing this signaling overhead may be valuable from a MBWA design standpoint. Consequently, various embodiments described herein may employ various techniques to reduce network signaling overhead.

For significant time durations T, mobile stations 102-1-m may be powered on in the communications system 100 but may not be in an active call session. To use time durations T as battery conserving opportunities, Idle Mode and Paging operations are described in the IEEE 802.16 standard. In accordance with these procedures, mobile stations 102-1-m may enter or switch into a low-power state referred to as idle mode. The IEEE 802.16 standard specifies techniques to force mobile stations 102-1-m back into an active mode whenever required by the communications system 100. This may occur, for example, when there is an incoming call or data packets for a mobile station 102-1-m. The IEEE 802.16 standard provides various procedures to force mobile stations 102-1-m back into an active mode from an idle mode.

While a mobile station 102-1-m is in idle mode, the communications system 100 maintains any desired connection states of the mobile station 102-1-m to facilitate a faster network entry for the mobile station 102-1-m if it needs to return from idle mode to active mode, such as when there is an incoming data or voice traffic pending for an idle mode mobile station, for example. This information may be referred to as Idle Mode Retain Information (IMRI). Examples of IMRI may include a connection identifier for a mobile station, a quality-of-service (QoS) parameter, authentication keys, and so forth. The embodiments are not limited in this context.

Furthermore, instead of tracking the exact location of an idle mode mobile station at all times, the IEEE 802.16 specifications describe procedures to only keep track of its approximate location as designated by a paging group 106-1-o. Typically, a paging group 106-1-o comprises of a cluster of one or more base stations 108-1-p. The communications system 100 only maintains the current paging group 106-1-o of the idle mode mobile station 102-1-m. When an idle mode mobile station 102-1-m moves out from its current paging group 106-1-o and enters a new paging group 106-1-o, its location information is updated. In this manner, the communications system 100 keeps track of the location information of the idle mode mobile station 102-1-m to the accuracy of a given paging area. The communications system 100 uses the approximate location information and IMRI of an idle mode mobile station 102-1-m to locate and set up new connections with the idle mode mobile station 102-1-m. When needed, the idle mode mobile station 102-1-m may be precisely tracked to its associated base station 108-1-p by sending a broadcast paging announcement message within all base stations 108-1-p that comprise the current paging group 106-1-o of the idle mode mobile station 102-1-m.

Various embodiments may include a novel architecture, operations, and signaling message flows to implement idle mode and paging operations for IEEE 802.16 based networks. In one embodiment, for example, network signaling overhead reduction may be implemented by using one or more foreign agents 105-1-q. Each foreign agent 105-1-q may have a foreign agent idle mode manager (FAIMM). The FAIMM may be used to store idle mode information, such as idle mode retain information (IMRI), the current paging group identifier (PGID), and the current paging controller identifier (PCID) for mobile stations 102-1-m operating in idle mode in the communications system 100. The PGID and PCID information stored by one or more foreign agents 105-1-q may be used by to send paging request(s) to one or more paging controllers 104-1-n to implement paging operations for the communications system 100.

Figure 2:
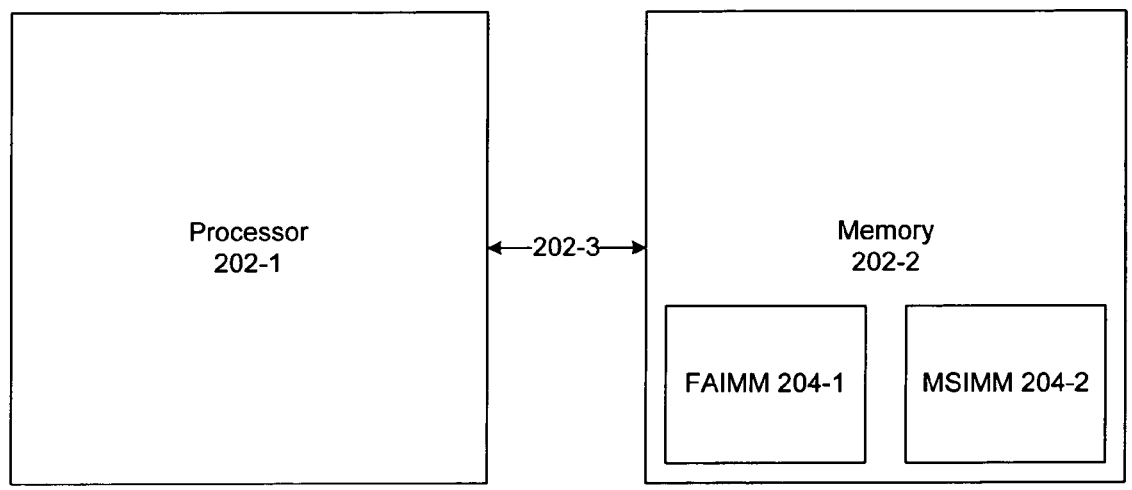
FIG. 2 illustrates one embodiment of a processing system.

FIG. 2 illustrates one embodiment of a processing system. FIG. 2 illustrates one embodiment of a processing system 200. Processing system 200 may be implemented for any of the nodes shown in FIG. 1. In various embodiments, processing system 200 may include one or more elements 202-1-x, where x is a positive integer. For example, processing system 200 may include a processor 202-1, a memory 202-2, and a data bus 202-3 to connect processor 202-1 with memory 202-2. Although a limited number of elements may be illustrated and described for processing system 200 by way of example, it may be appreciated that more or less elements may be implemented for processing system 200, and still fall within the scope of the embodiments. The embodiments are not limited in this context.

In one embodiment, for example, element 202-1 may comprise a processor. Processor 202-1 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202-1 may be implemented as a general purpose processor, such as a processor made by Intel®Corporation, Santa Clara, Calif. Processor 202-1 may also be implemented as a dedicated processor, such as a controller, microcontroller, embedded processor, a digital signal processor (DSP), a network processor, a media processor, an input/output (I/O) processor, and so forth. The embodiments are not limited in this context.

In various embodiments, processing system 200 may include an element 202-2. In one embodiment, for example, element 202-2 may comprise memory. Memory 202-2 may include any machine-readable or computer-readable media capable of storing data, including both volatile and non-volatile memory. For example, memory 202-2 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 202-2 may be included on the same integrated circuit as processor 202-1, or alternatively some portion or all of memory 202-2 may be disposed on an integrated circuit or other medium, for example a hard disk drive, that is external to the integrated circuit of processor 202-1. The embodiments are not limited in this context.

In various embodiments, memory 202-2 may include one or more elements, such as elements 204-1-y, where y represents a positive integer. In one embodiment, for example, memory 202-2 may include a FAIMM 204-1 and/or a mobile station idle mode manager (MSIMM) 204-2. The MSIMM may be arranged to handle the idle mode and paging related operations at a mobile station. When implemented as part of a foreign agent 105-1-q, processor 202-1 may execute FAIMM 204-1 of memory 202-2. When implemented as part of a mobile station 102-1-m, processor 202-1 may execute MSIMM 204-2 of memory 202-2. Although a limited number of elements may be illustrated and described for memory 202-2 by way of example, it may be appreciated that more or less elements may be implemented for memory 202-2, and still fall within the scope of the embodiments. Furthermore, it may be appreciated that FAIMM 204-1 and MSIMM 204-2 may be implemented using software, hardware, or a combination of both, as desired for a given set of performance and design constraints. The embodiments are not limited in this context.

In various embodiments, FAIMM 204-1 may be used to store idle mode information for mobile stations 102-1-m operating in idle mode in a communications system 100. The idle mode information may include any information used to locate and/or page a mobile station 102-1-m. Examples of idle mode information may include a mobile station identifier (MSID) of each idle mode mobile station 102-1-m that went idle originally at the foreign agent 105-1-q, a paging group identifier (PGID) and paging controller identifier (PCID) corresponding to each MSID, IMRI corresponding to each MSID, and so forth. FAIMM 204-1 may maintain the idle mode information in an idle mode information table for each mobile station 102-1-m that went to idle mode while being active in the subnet of the corresponding foreign agent 105-1-q. An example of an idle mode information table for the FAIMM 204-1 of foreign agent 105-1-q is shown in TABLE 1 as follows:

TABLE 1

| MSID | PCID, PGID | IMRI |
|---|---|---|
| MSIDMS1 | PC1, PG2 | IMRIMS1 |
| MSIDMS2 | PC2, PG3 | IMRIMS2 |
| MSIDMS3 | PC3, PG4 | IMRIMS3 |
| MSIDMS4 | PC4, PG1 | IMRIMS4 |

As shown in TABLE 1, each entry of the idle mode information table maintained by FAIMM 204-1 may have three columns. The first column is the MSID, the second column is a PCID and PGID corresponding to the MSID, and the third column is IMRI corresponding to the MSID. When an idle mode mobile station 102-1-m having idle mode information stored in the idle mode information table of the FAIMM 204-1 of a foreign agent 105-1-q moves from one paging area to another, FAIMM 204-1 updates the PCID and PGID for that mobile station 102-1-m. In this manner, FAIMM 204-1 maintains current or up-to-date information about the PGID and PCID of each idle mode MS that are in its idle mode information table.

In various embodiments, FAIMM 204-1 may be used to keep paging controllers 104-1-n updated of a current paging group 106-1-o associated with a mobile station 102-1-m. Paging controllers 104-1-n may perform the paging operations upon receiving paging requests from a foreign agent 105-1-q. Paging groups 106-1-o may be identified by a PGID and represent the coverage area of a cluster of base stations 108-1-p (e.g., base stations of a paging area). The FAIMM 204-1 may maintain the PCID and PGID for mobile stations 102-1-m in idle mode. As long as mobile stations 102-1-m in an idle mode remain in a given paging group 106-1-o they do not have to update their location information (i.e., PGID). If mobile stations 102-1-m trigger a location update event such as crossing into different paging groups 106-1-o while in the idle mode, however, mobile stations 102- 1 -m perform a location update procedure to update FAIMM 204-1 of foreign agents 105-1-q of the new paging group(s) 106-1-o. Alternatively, mobile stations 102-1-m may perform location update procedures in response to other location update events, such as at periodic or aperiodic time intervals using a system timer, and other location update events as well. The embodiments are not limited in this context.

In various embodiments, paging controllers 104-1-n may process the paging requests from foreign agent 105-1-q to track down and reach mobile stations 102-1-m in idle mode within the coverage area of their respective paging groups 106-1-o. This may be implemented using any number of paging techniques. For example, a paging controller 104-1-n may broadcast a paging announcement message, such as a mobile-paging-advertising (MOB-PAG-ADV) message, for example. The broadcast message may be broadcast by all base stations 108-1-p in the respective paging groups 106-1-o whenever the communications system 100 needs to reach any one of mobile stations 102-1-m. There may be a variety of reasons for the communications system 100 to reach mobile stations 102-1-m. For example, to request an update of its location (i.e., paging group 106-1-o), perform network entry (e.g., when there is an incoming packet), among other reasons.

In various embodiments, each paging controller 104-1-n maintains an idle mode register table that keeps information about all mobile stations 102-1-4 that are in idle mode and residing in the particular paging group(s) 106-1-3 managed by the respective paging controller 104-1-2. FIG. 1 illustrates a snapshot in time t of four representative mobile stations 102-1-4 in idle mode. At time t, all four mobile stations 102-1-4 are located in coverage area of base station 108-4 and in paging group 106-2, for example. Prior to t, mobile station 102-1 was in coverage area of base station 108-3 in paging group 106-1 and moved to base station 108-4 in paging group 106-2 as indicated by vector 110. Prior to t, mobile station 102-4 was in coverage area of base station 108-5 in paging group 106-3 and moved to base station 108-4 in paging group 106-2 as indicated by vector 112. Although only four idle mode mobile stations 102-1-4 are shown in FIG. 1, it will be expected that in actual deployments additional mobile stations, both idle mode and active mode, may be present in the coverage area of base station 108-4. The embodiments are not limited in this context.

Accordingly, various embodiments may be implemented in accordance with the following techniques for using location information to broadcast paging announcement messages in the communications system 100. The techniques may include various operations/procedures and accompanying message flows. For example, the techniques may include a procedure at the communications system 100 provisioning time, a procedure when mobile stations 102-1-4 enter idle mode, a procedure when idle mode mobile stations 102-1-4 perform location update, a procedure when idle mode mobile stations 102-1-4 perform foreign agent 105-1-q migration, and a procedure for paging idle mode mobile stations 102-1-4.

Figure 3:
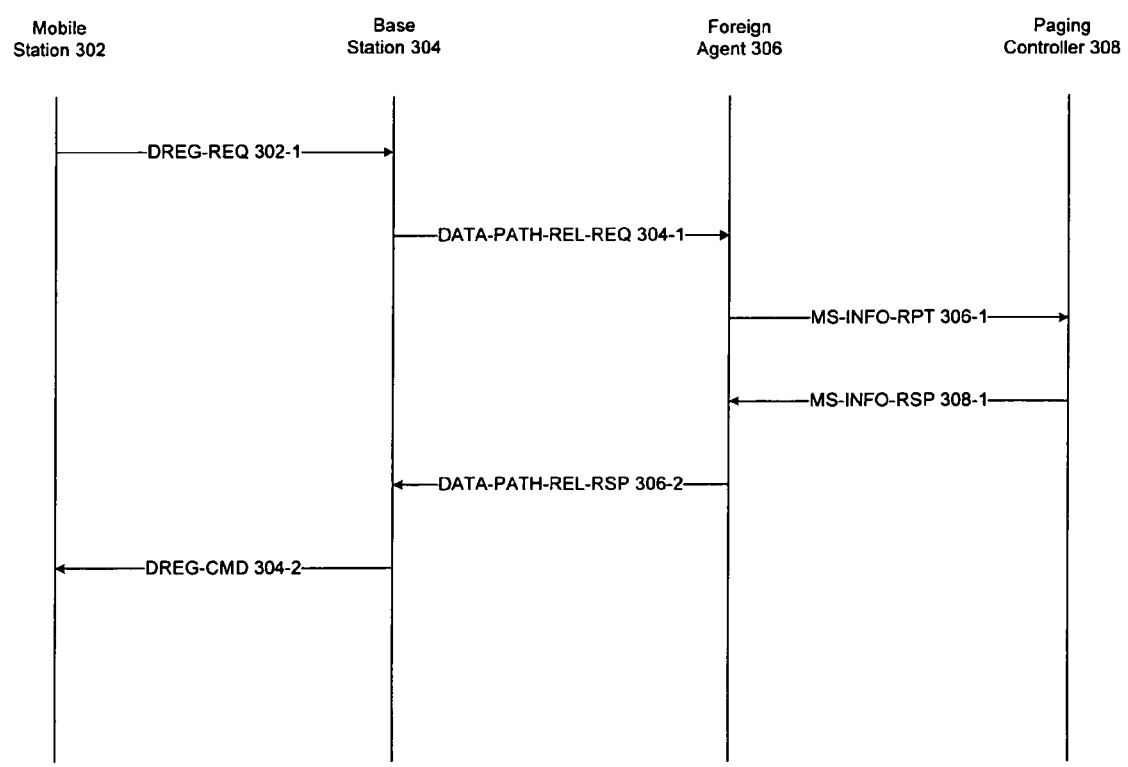
FIG. 3 illustrates one embodiment of a first message flow.

FIG. 3 illustrates one embodiment of a first message flow. FIG. 3 illustrates a message flow 300. Message flow 300 may be representative of, for example, operations for when a mobile station 102-1-m (e.g., mobile station 102-1) enters into an idle mode (e.g., from an active mode). Message flow 300 may illustrate messages communicated between a mobile station 302, a base station 304, a foreign agent 306 and a paging controller 308, which may be representative of one or more mobile stations 102-1-m, base stations 108-1-p, foreign agents 105-1-q, and paging controllers 104-1-n, respectively.

As shown in message flow 300, when mobile station 302 decides to initiate idle mode, it sends a deregistration request (DREG-REQ) message 302-1 using the format defined in IEEE 802.16e or any other suitable protocol to its serving base station 304. The mobile station 302 includes its MSID in DREG-REQ message 302-1. Upon receiving DREG-REQ message 302-1, base station 304 sends a data path release request (DATA-PATH-REL-REQ) message 304-1 to a corresponding foreign agent 306 to trigger the data path release process for mobile station 302. The DATA-PATH-REL-REQ message 304-1 may include information such as a MSID, base station identifier (BSID), PGID, PCID, and IMRI.

When foreign agent 306 receives DATA-PATH-REL-REQ message 304-1, its FAIMM 204-1 adds the MSID, PGID, PCID, and IMRI information to its idle mode information table. Foreign agent 306 may then send a mobile station information report (MS-INFO-RPT) message 306-1 to paging controller 308 as identified by the PCID of DATA-PATH-REL-REQ message 304-1. MS-INFO-RPT message 306-1 may include information such as a MSID and PGID.

When paging controller 308 receives the MS-INFO-RPT message 306-1, paging controller 308 adds mobile station 302 to its idle mode register table of mobile stations in the paging area identified by the PGID of the MS-INFO-RPT message 306-1. Paging controller 308 may send a mobile station information response (MS-INFO-RSP) message 308-1 to foreign agent 306. MS-INFO-RSP message 308-1 may include information such as a MSID, PGID, and PCID.

When foreign agent 306 receives the MS-INFO-RSP message 308-1, foreign agent 306 may then send a data path release response (DATA-PATH-REL-RSP) message 306-2 to base station 304. DATA-PATH-REL-RSP message 306-2 may include such information as a MSID, PGID, PCID, and foreign agent identifier (FAID) to base station 304. The FAID is an identifier for foreign agent 306. Foreign agent 306 then becomes an anchor foreign agent 306 for mobile station 302. The FAID for anchor foreign agent 306 may also be referred to herein as anchor FAID (AFAID) in the following description.

Base station 304 may receive DATA-PATH-REL-RSP message 306-2. Upon receiving DATA-PATH-REL-RSP message 306-2, base station 304 may send a deregistration command (DREG-CMD) message 304-2 containing the AFAID to mobile station 302.

When mobile station 302 receives DREG-CMD message 304-2, mobile station 302 may enter into or switch to idle mode operations. Mobile station 302 may use MSIMM 204-2 to store the AFAID for location update purposes. Finally, mobile station 302 listens to paging announcement messages in the current paging area to acquire a current PGID. Mobile station 302 needs the PGID to do a location update in case the PGID changes.

It is worthy to note that for the penultimate step, the DREG-CMD as defined by the IEEE 802.16 specification contains a "Paging-controller-ID." The IEEE 802.16 specification, however, does not restrict the "Paging-controller-ID" to the notion of the PCID in the networking working group (NWG). Consequently, it is possible to map the "Paging-controller-ID" as defined by IEEE 802.16 to the AFAID as used herein. In this manner, call delivery latency to mobile station 302 may be reduced.

Figure 4:
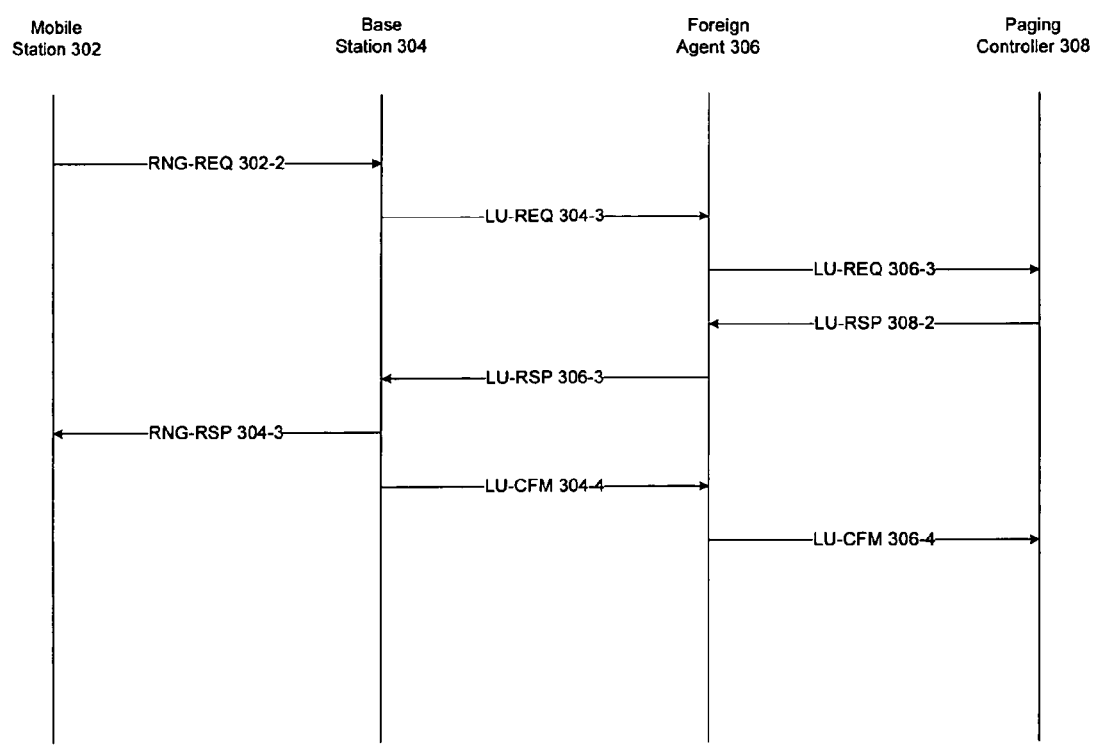
FIG. 4 illustrates one embodiment of a second message flow.

FIG. 4 illustrates one embodiment of a second message flow. FIG. 4 illustrates a message flow 400. Message flow 400 may be representative of, for example, operations for when mobile station 302 performs location update operations. When idle mode mobile station 302 moves from one paging area to another it performs location update operations, for example. During normal operations, mobile station 302 may move from one paging group 106-1-o to a different paging group 106-1-o. As mobile station 302 moves between paging groups 106-1-o, mobile station 302 acquires a new PGID for the new paging group 106-1-o. Mobile station 302 may compare the new PGID with its current PGID as stored by MSIMM 204-2. If the new PGID and current PGID fail to match, mobile station 302 initiates location update operations to update location information stored by paging controller 308 and FAIMM 204-1 of foreign agent 306.

As shown in message flow 400, mobile station 302 sends a ranging request (RNG-REQ) message 302-2 to base station 304 indicating that it needs to perform location update operations. Mobile station 302 includes its AFAID in RNG-REQ message 302-2, such as in the "Paging-controller-ID" field of RNG-REQ message 302-2, for example.

Upon receiving RNG-REQ message 302-2, base station 304 sends a location update request (LU-REQ) message 304-3 to anchor foreign agent 306 identified by AFAID in RNG-REQ message 302-2. LU-REQ message 304-3 may contain information such as an MSID, PGID, PCID, and AFAID. It may be noted that the PGID and PCID corresponds to a new paging area for mobile station 302.

Anchor foreign agent 306 may receive LU-REQ message 304-3. Upon receiving LU-REQ message 304-3, anchor foreign agent 306 may forward LU-REQ message 304-3 in the form of sending LU-REQ message 306-3 to paging controller 308 as identified by the PCID.

Paging controller 308 may receive LU-REQ message 306-3. Upon receiving LU-REQ message 306-3, paging controller 308 adds mobile station 302 to its idle mode register table of mobile stations in the paging area identified by the PGID of the LU-REQ message 306-3. Then, the paging controller 308 may send a location update response (LU-RSP) message 308-2. LU-RSP message 308-2 may include information such as MSID, PGID, and PCID.

When anchor foreign agent 306 receives LU-RSP message 308-2, FAIMM 204-1 of anchor foreign agent 306 updates its idle mode information table to reflect the change of PGID and PCID for mobile station 302. Anchor foreign agent 306 then forwards LU-RSP 308-2 in the form of sending LU-RSP 306-3 to base station 304.

When base station 304 receives LU-RSP message 306-3, base station 304 sends RNG-RSP message 304-3 to mobile station 302 to inform mobile station 302 about the successful completion of the location update operations. Base station 304 then sends a location update confirm (LU-CFM) message 304-4 to anchor foreign agent 306. LU-CFM message 304-4 may include information such as MSID, PGID, and PCID. Anchor foreign agent 306 forwards LU-CFM message 304-4 in the form of sending LU-CFM message 306-4 to paging controller 308.

Figure 5:
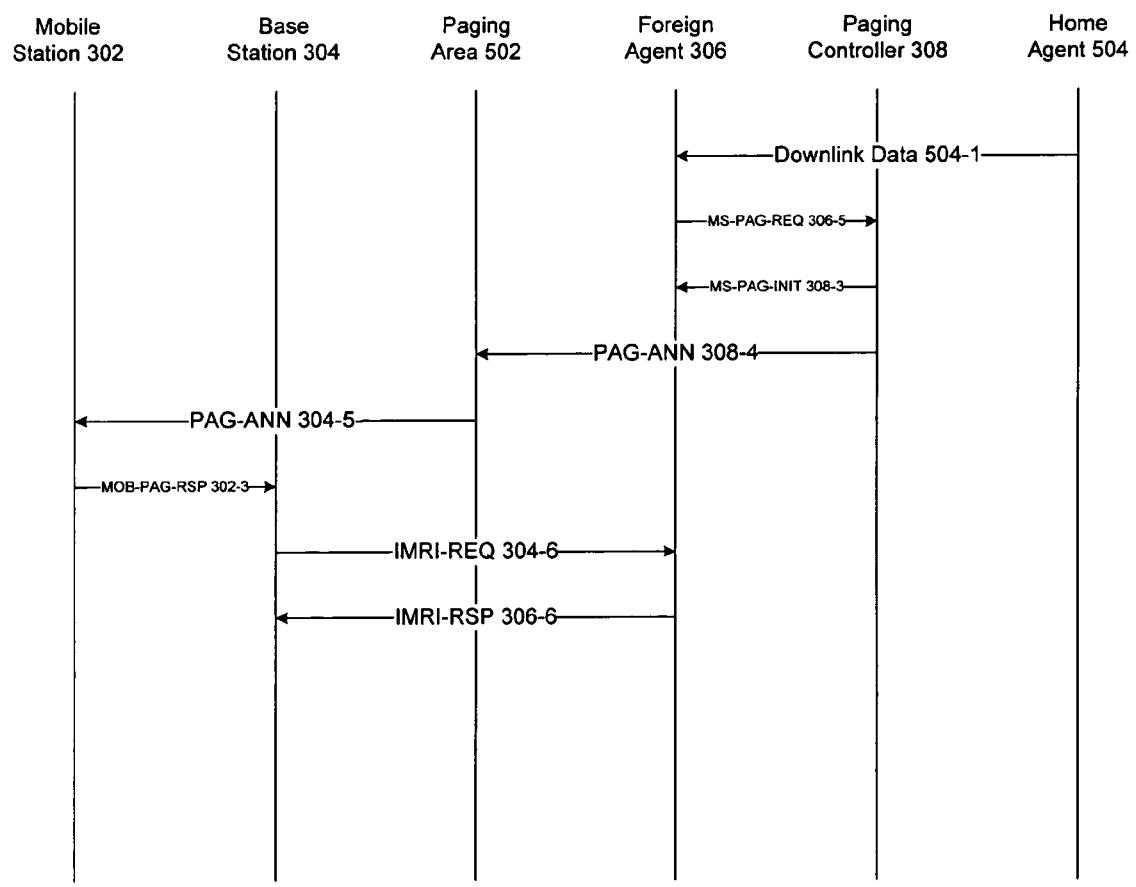
FIG. 5 illustrates one embodiment of a third message flow.

FIG. 5 illustrates one embodiment of a third message flow. FIG. 5 illustrates a message flow 500. Message flow 500 may be representative of, for example, operations for paging idle mode mobile station 302 and for mobile station 302 to exit idle mode. When a communications system 100 needs to locate idle mode mobile station 302, paging controller 308 may page idle mode mobile station 302 using, for example, a MOB-PAG-ADV message. It may be noted that the need to locate idle mode mobile station 302 may arise because of the arrival of new packets destined for idle mode mobile station 302, for example. Message flow 500 assumes that all packets destined for idle mode mobile station 302 first reaches a home agent 504 for idle mode mobile station 302. Home agent 504 may be representative of, for example, home agent 101 as described with reference to FIG. 1.

As shown in message flow 500, home agent 504 forwards any received packets destined for idle mode mobile station 302 in the form of downlink data 504-1 to anchor foreign agent 306. Home agent 504 may accomplish this, for example, using Mobile IP address binding that is present in a database for home agent 504.

Upon receiving downlink data 504-1, anchor foreign agent 306 determines that mobile station 302 is currently operating in idle mode. Anchor foreign agent 306 may determine that a mobile station is in idle mode using different techniques. For example, anchor foreign agent 306 searches the idle mode information table of its FAIMM 204-1 and determines that mobile station 302 is currently operating in idle mode if it finds the MSID of the mobile station in the idle mode information table of its FAIMM 204-1. FAIMM 204-1 for anchor foreign agent 306 looks up a current PGID and PCID of mobile station 302 from its idle mode information table. Anchor foreign agent 306 then sends a mobile station paging request (MS-PAG-REQ) message 306-5 to the corresponding paging controller 308.

When paging controller 308 receives MS-PAG-REQ message 306-5, paging controller 308 checks its database to learn if mobile station 302 is in idle mode in a paging area 502 as identified by the PGID. If mobile station 302 is in idle mode in a paging area 502, paging controller 308 sends a mobile station paging initiation (MS-PAG-INIT) message 308-3 to anchor foreign agent 306. Paging controller 308 also broadcasts a paging announcement message in the form of a paging announcement (PAG-ANN) message 308-4 to all base stations in paging area 502 as identified by the PGID. Each base station in the paging area identified by the PGID, including base station 304, broadcasts PAG-ANN 304-5. PAG-ANN 304-5 may include information such as MSID.

Assuming mobile station 302 currently resides in the coverage area of base station 304, mobile station 302 receives the paging announcement message containing its MSID. Mobile station 302 may reply to the paging announcement message using a mobile page response (MOB-PAG-RSP) message 302-3. MOB-PAG-RSP message 302-3 may contain information such as MSID and AFAID.

Base station 304 may receive MOB-PAG-RSP message 302-3. Base station 304 learns the identity of anchor foreign agent 306 using the AFAID provided with MOB-PAG-RSP message 302-3. Base station 304 may send an IMRI request (IMRI-REQ) message 304-6 to anchor foreign agent 306 corresponding to the AFAID. IMRI-REQ message 304-6 may include information such as MSID and BSID.

When anchor foreign agent 306 receives IMRI-REQ message 304-6, FAIMM 204-1 retrieves IMRI information for mobile station 302 from its idle mode information table. Anchor foreign agent 306 sends an IMRI response (IMRI-RSP) message 306-6 with the retrieved IMRI information to base station 304. Base station 304 initiates mobile station re-entry operations to allow mobile station 302 to re-establish connectivity with the communications system 100.

Figure 6:
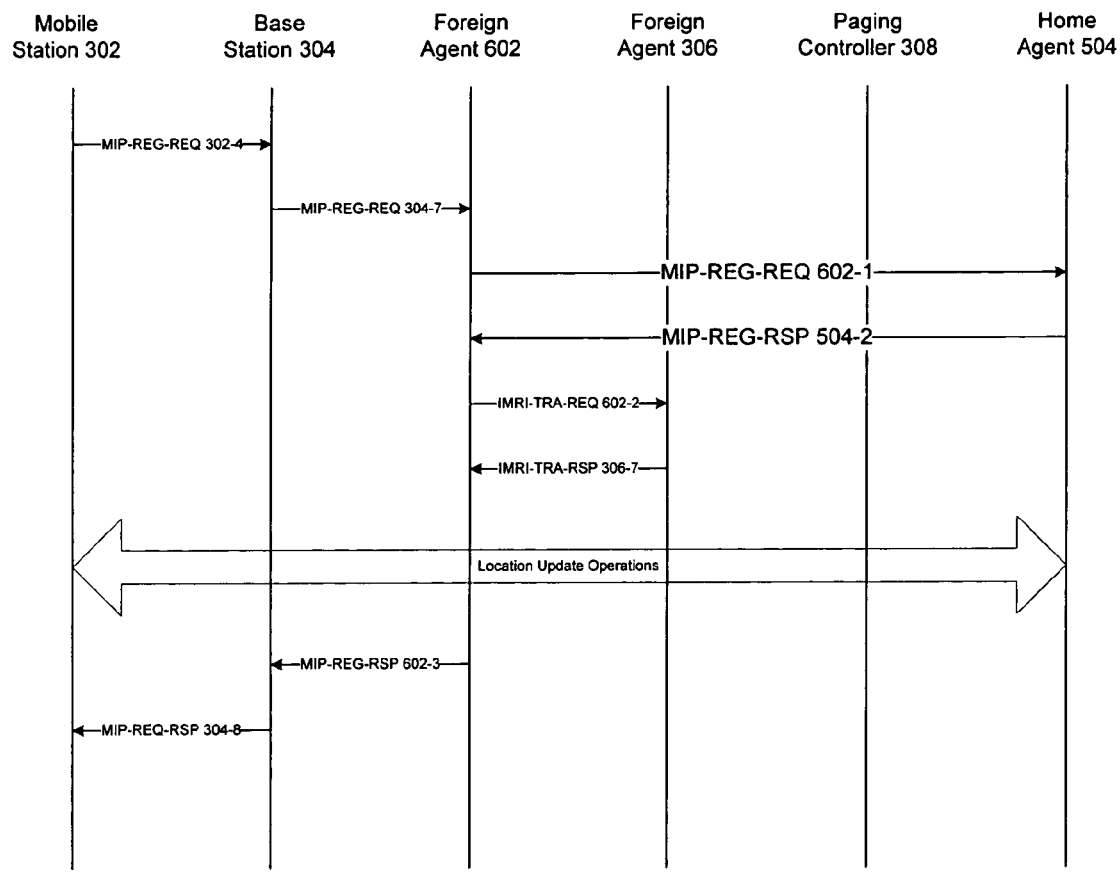
FIG. 6 illustrates one embodiment of a fourth message flow.

FIG. 6 illustrates one embodiment of a fourth message flow. FIG. 6 illustrates a message flow 600. Message flow 600 may be representative of, for example, foreign agent migration operations. Foreign agent migration operations may refer to the operations performed when idle mode information for idle mode mobile station 302 needs to be transferred from foreign agent 306 to a new foreign agent. The need for foreign agent migration operations for idle mode mobile station 302 may arise because of several foreign agent migration conditions. An example of a foreign agent migration condition may include when idle mode mobile station 302 crosses a predefined number of IP subnets while in the idle mode. Other foreign agent migration conditions may be implemented as desired for a given set of performance or design constraints.

As shown in message flow 600, when idle mode mobile station 302 detects a foreign agent migration condition, it initiates foreign agent migration operations in order to update its current foreign agent (e.g., anchor foreign agent 306) with a new foreign agent 602. To accomplish this, idle mode mobile station 302 sends a Mobile IP registration request (MIP-REG-REQ) message 302-4 that is destined eventually for HA 504 to base station 304. MIP-REG-REQ message 302-4 may include a new FAID for the foreign agent migration operations. The mobile station 302 may learn the new FAID from Mobile IP agent advertisement message, and using other techniques as well. The embodiments are not limited in this context.

Base station 304 may receive MIP-REG-REQ message 302-4 from idle mobile station 302. Base station 304 then forwards MIP-REG-REQ message 302-4 to new foreign agent 602 identified by the new FAID in the form of MIP-REG-REQ message 304-7.

Foreign agent 602 may receive MIP-REG-REQ message 304-7, and initiate Mobile IP care-of-address (CoA) update operations. Foreign agent 602 may accomplish this by forwarding MIP-REG-REQ message 304-7 in the form of MIP-REG-REQ 602-1 to home agent 504. Home agent 504 may complete the Mobile IP CoA update operations by binding the foreign agent 602 to the permanent IP address of mobile station 302. After successful completion of Mobile IP CoA update operations, home agent 504 sends Mobile IP registration reply (MIP-REG-RSP) message 504-2 to foreign agent 602.

When foreign agent 602 receives MIP-REG-RSP message 504-2, foreign agent 602 learns that mobile station 302 is currently operating in an idle mode. Foreign agent 602 then contacts anchor foreign agent 306 of mobile station 302, and sends a IMRI transfer request (IMRI-TRA-REQ) message 602-2 requesting transfer of the IMRI information for mobile station 302 to foreign agent 602. Anchor foreign agent 306 retrieves the IMRI information for mobile station 302 as stored by FAIMM 204-1 in its idle mode information table, and sends the retrieved IMRI information to foreign agent 602 using a IMRI transfer response (IMRI-TRA-RSP) message 306-7.

When foreign agent 602 receives IMRI-TRA-RSP message 306-7, FAIMM 204-1 of foreign agent 602 retrieves the IMRI information from IMRI-TRA-RSP message 306-7 and stores the IMRI information in its idle mode information table. The communications system 100 then requests mobile station 302 to perform location update operations as previously described with reference to FIG. 4. FAIMM 204-1 of foreign agent 602 adds the updated information (PCID and PGID) about mobile station 302 to its idle mode information table. At this point foreign agent 602 becomes the new anchor foreign agent for mobile station 302. Foreign agent 602 sends a Mobile IP registration response (MIP-REG-RSP) message 602-3 to base station 304. Base station 304 in turn forwards MIP-REG-RSP message 602-3 to mobile station 302 via MIP-REG-RSP message 304-8.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

As previously described, foreign agents 105-1-q may be used to track and store idle mode information (e.g., current PGID, current PCID, and IMRI) for mobile stations 102-1-m. Paging controllers 104-1-n may use the location information to perform paging operations for various mobile stations 102-1-m operating in an idle mode. The paging operations may be implemented in accordance with any number of paging techniques as defined by the IEEE 802.16 series of protocols, and other suitable protocols as well. The embodiments are not limited in this context.

Figure 7:
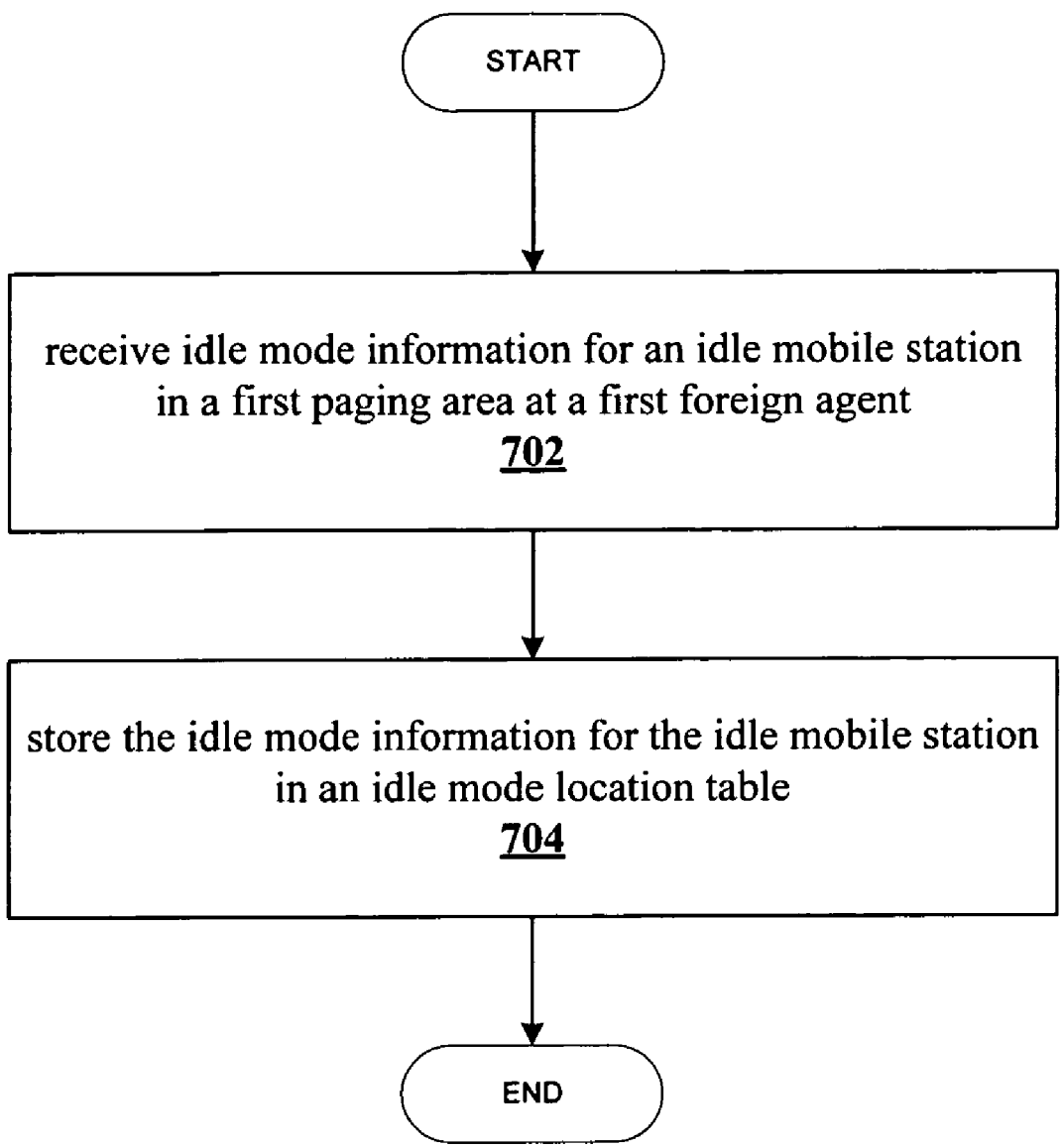
FIG. 7 illustrates one embodiment of a first logic flow.

FIG. 7 illustrates one embodiment of a first logic flow. FIG. 7 illustrates a logic flow 700. Logic flow 700 may represent various operations as described with reference to FIGS. 3-6, such as foreign agent 306 and/or 602, for example. As shown in logic flow 700, idle mode information for an idle mobile station in a first paging area may be received at a first foreign agent at block 702. The idle mode information for the idle mobile station may be stored in an idle mode information table at block 704. The embodiments are not limited in this context.

In one embodiment, for example, a data path release request message may be received having a mobile station identifier, a base station identifier, a paging group identifier, a paging controller identifier and idle mode retain information. A mobile station information report message may be sent having the mobile station identifier and the paging group identifier. A mobile station information response message may be received having the mobile station identifier, the paging group identifier and a paging controller identifier. A data path release response message may be sent having the mobile station identifier, the paging group identifier, the paging controller identifier and a foreign agent identifier. The embodiments are not limited in this context.

In one embodiment, a paging group identifier and a paging controller identifier may be updated when the idle mobile station moves from the first paging area to a second paging area. For example, a location update request message may be received having a base station identifier, a mobile station identifier, a paging group identifier, a paging controller identifier and a foreign agent identifier. The location update request message may be sent to a paging controller corresponding to the paging controller identifier. A location update response message may be received from the paging controller. The idle mode information table may be updated with the paging group identifier and the paging controller identifier. The location update response message may be sent to a base station corresponding to the base station identifier. A location update confirm message may be received from the base station. The location update confirm message may be sent to the paging controller. The embodiments are not limited in this context.

In one embodiment, the paging requests may be sent to a paging controller to perform paging operations for the idle mobile station. The embodiments are not limited in this context.

In one embodiment, the idle mode information may be transferred from the first foreign agent to a second foreign agent in response to a foreign agent migration condition. The embodiments are not limited in this context.

Figure 8:
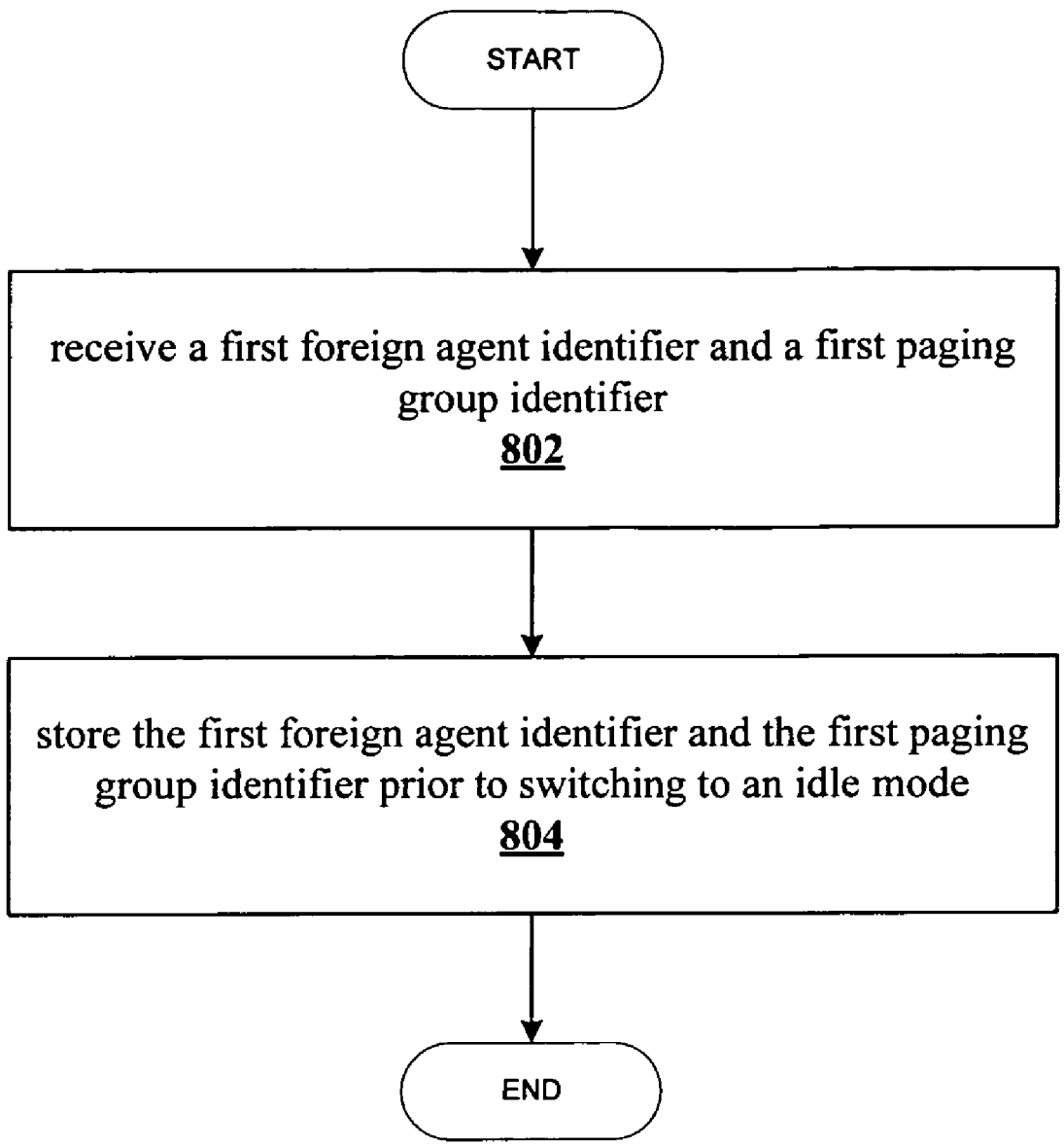
FIG. 8 illustrates one embodiments of a second logic flow.
Figure 1:
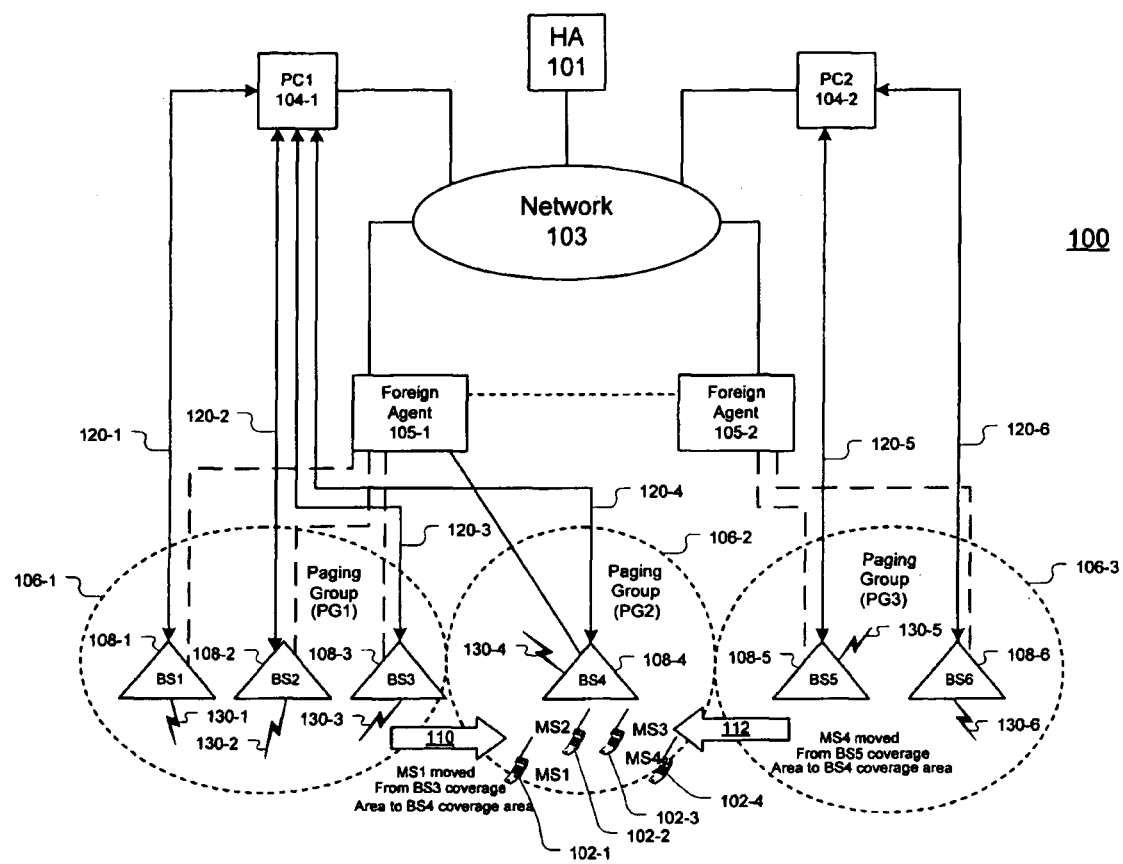

FIG. 8 illustrates one embodiment of a second logic flow. FIG. 8 illustrates a logic flow 800. Logic flow 800 may represent various operations as described with reference to FIGS. 3-6, such as mobile station 302, for example. As shown in logic flow 800, a first foreign agent identifier and a first paging group identifier may be received at block 802. The first foreign agent identifier and the first paging group identifier may be stored prior to switching to an idle mode at block 804. The embodiments are not limited in this context.

In one embodiment, a deregistration request may be sent. A deregistration command with the first foreign agent identifier may be received. A paging announcement message with the first paging group identifier may be received. The first foreign agent identifier and the first paging group identifier may be stored. A mobile station may then switch to the idle mode. The embodiments are not limited in this context.

In one embodiment, a second paging group identifier may be received. A location update message may be sent with the first foreign agent identifier if the first paging group identifier and the second paging group identifier fail to match. The embodiments are not limited in this context.

In one embodiment, a paging announcement message may be received having a mobile station identifier for said mobile station. A mobile paging response message may be sent with the first foreign agent identifier. The embodiments are not limited in this context.

In one embodiment, a mobile Internet Protocol registration message may be sent. A mobile IP registration request may be received with a second foreign agent identifier.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

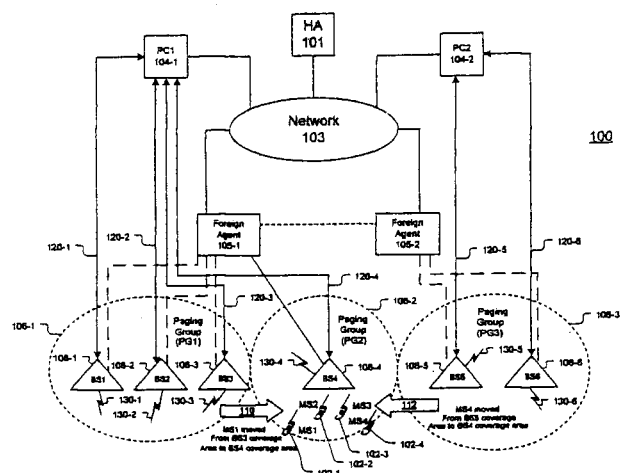

The invention claimed is:

1. An apparatus comprising a first foreign agent having a foreign agent idle mode manager to store idle mode information for an idle mobile station in a first paging area of a wireless network and to send a paging request to a paging controller to perform paging operations for said idle mobile station, said first foreign agent idle mode manager to store said idle mode information in an idle mode information table, said idle mode information comprising a mobile station identifier, a paging group identifier, a paging controller identifier, and idle mode retention information, the paging controller identifier mapped to a foreign agent identifier corresponding to the first foreign agent to establish the first foreign agent as an anchor foreign agent for the idle mobile station, the anchor foreign agent to send a mobile station information report to a paging controller identified by the paging controller identifier in response to receipt of a data path release request.

2. The apparatus of claim 1, said foreign agent idle mode manager to update a paging group identifier and a paging controller identifier when said idle mobile station moves from said first paging area to a second paging area.

3. The apparatus of claim 1, said foreign agent idle mode manager to inform a paging controller of a current location for said idle mode mobile station.

4. The apparatus of claim 1, comprising a second foreign agent, said first foreign agent to transfer said idle mode information to said second foreign agent in response to a foreign agent migration condition.

5. An apparatus comprising a mobile station having a mobile station idle mode manager to store a first foreign agent identifier and a first paging group identifier prior to said mobile station switching to an idle mode, said mobile station idle mode manager to send a deregistration request and idle mode information, and to receive a deregistration command with said first foreign agent identifier, said idle mode information comprising a mobile station identifier, a paging group identifier, a paging controller identifier, and idle mode retention information, the paging controller identifier mapped to the first foreign agent identifier to establish the first foreign agent as an anchor foreign agent for the mobile station, the anchor foreign agent operative to send a mobile station information report to a paging controller identified by the paging controller identifier in response to receipt of a data path release request.

6. The apparatus of claim 5, said mobile station idle mode manager to receive a second paging group identifier from a paging announcement message, and to send a location update message with said first foreign agent identifier if said first paging group identifier and said second paging group identifier fail to match.

7. The apparatus of claim 5, said mobile station idle mode manager to receive a paging announcement message having a mobile station identifier for said mobile station, and to send a mobile paging response message with said first foreign agent identifier.

8. The apparatus of claim 5, said mobile station idle mode manager to send a mobile Internet Protocol registration request message, and to receive a mobile Internet Protocol registration reply message with a second foreign agent identifier.

9. A method, comprising:
receiving idle mode information for an idle mobile station in a first paging area at a first foreign agent;
storing said idle mode information for said idle mobile station in an idle mode information table
receiving a data path release request message having a mobile station identifier, a base station identifier, a paging group identifier, a paging controller identifier and idle mode retain information;
sending a mobile station information report message having said mobile station identifier and said paging group identifier;
receiving a mobile station information response message having said mobile station identifier, said paging group identifier and said paging controller identifier; and
sending a data path release response message having said mobile station identifier, said paging group identifier, said paging controller identifier and a foreign agent identifier, the paging controller identifier mapped to the foreign agent identifier to establish the first foreign agent as an anchor foreign agent for the mobile station.

10. The method of claim 9, comprising updating a paging group identifier and a paging controller identifier when said idle mobile station moves from said first paging area to a second paging area.

11. The method of claim 9, comprising:
receiving a location update request message having a base station identifier, a mobile station identifier, a paging group identifier, a paging controller identifier and a foreign agent identifier;
sending said location update request message to a paging controller corresponding to said paging controller identifier;
receiving a location update response message from said paging controller;
updating said idle mode information table with said paging group identifier and said paging controller identifier;
sending said location update response message to a base station corresponding to said base station identifier;

receiving a location update confirm message from said base station; and sending said location update confirm message to said paging controller.

12. The method of claim 9, comprising:

receiving data packets for said idle mode mobile station by said first foreign agent; and sending a paging request to a paging controller to perform paging operations for said idle mode mobile station.

13. The method of claim 9, comprising transferring said idle mode information from said first foreign agent to a second foreign agent in response to a foreign agent migration condition.

14. An article comprising a non-transitory computer-readable storage medium containing instructions that if executed by a processor enable a system to receive idle mode information for an idle mobile station in a first paging area at a first foreign agent, store said idle mode information for said idle mobile station in an idle mode information table, receive a data path release request message having a mobile station identifier, a base station identifier, a paging group identifier, a paging controller identifier and idle mode retain information, send a mobile station information report message having said mobile station identifier and said paging group identifier, receive a mobile station information response message having said mobile station identifier, said paging group identifier and a paging controller identifier, and send a data path release response message having said mobile station identifier, said paging group identifier, said paging controller identifier and a foreign agent identifier, the paging controller identifier mapped to the foreign agent identifier to establish the first foreign agent as an anchor foreign agent for the mobile station.

15. The article of claim 14, further comprising instructions that if executed enable the system to update a paging group identifier and a paging controller identifier when said idle mobile station moves from said first paging area to a second paging area.

16. The article of claim 14, further comprising instructions that if executed enable the system to receive a location update request message having a base station identifier, a mobile station identifier, a paging group identifier, a paging controller identifier and a foreign agent identifier, send said location update request message to a paging controller corresponding to said paging controller identifier, receive a location update response message from said paging controller, update said idle mode information table with said paging group identifier and said paging controller identifier, send said location update response message to a base station corresponding to said base station identifier, receive a location update confirm message from said base station, and send said location update confirm message to said paging controller.

17. The article of claim 14, further comprising instructions that if executed enable the system to receive data packets for said idle mode mobile station by said first foreign agent, and send a paging request to a paging controller to perform paging operations for said idle mode mobile station.

18. The article of claim 14, further comprising instructions that if executed enable the system to transfer said idle mode information from said first foreign agent to a second foreign agent in response to a foreign agent migration condition.

* * * * *

UNITED STATES PATENT AND TRADEMARK OFFICE
CERTIFICATE OF CORRECTION

| | | |
|---|---|---|
| PATENT NO. | : 8,145,243 B2 | |
| APPLICATION NO. | : 11/270765 | |
| DATED | : March 27, 2012 | |
| INVENTOR(S) | : Shantidev Mohanty et al. | |

It is certified that error appears in the above-identified patent and that said Letters Patent is hereby corrected as shown below:

Delete the title page showing an illustrative figure and substitute the attached title page therefor.

On the Title page, in field (56), in column 2, under "Other Publications", line 3, delete "Enivornment"," and insert -- Environment", --, therefor.

On sheet 1 of 8, in Figure 1, line 3, above "120-6" insert -- 100 --.

On sheet 2 of 8, in Figure 2, line 1, above "202-3" insert -- Processing System 200 --.

On sheet 3 of 8, in Figure 3, line 1, above "Base Station 304" insert -- 300 --.

On sheet 4 of 8, in Figure 4, line 1, above "Base Station 304" insert -- 400 --.

On sheet 5 of 8, in Figure 5, line 1, above "Paging Area 502" insert -- 500 --.

On sheet 6 of 8, in Figure 6, line 1, above "Foreign Agent 602" insert -- 600 --.

On sheet 7 of 8, in Figure 7, line 1, after "START" insert -- 700 --.

On sheet 8 of 8, in Figure 8, line 1, after "START" insert -- 800 --.

In column 20, line 30, in claim 9, after "table" insert -- ; --.

Signed and Sealed this
Seventeenth Day of July, 2012

David J. Kappos
*Director of the United States Patent and Trademark Office*

CERTIFICATE OF CORRECTION (continued)

(12) United States Patent
Mohanty et al.

(10) Patent No.: US 8,145,243 B2
(45) Date of Patent: **\*Mar. 27, 2012**

(54) TECHNIQUES FOR LOCATION MANAGEMENT AND PAGING IN A COMMUNICATION SYSTEM

(75) Inventors: Shantidev Mohanty, Hillsboro, OR (US); Muthaiah Venkatachalam, Beaverton, OR (US); Sameer Pareek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1487 days.

This patent is subject to a terminal disclaimer.

(21) Appl. No.: 11/270,765

(22) Filed: Nov. 8, 2005

(65) Prior Publication Data

US 2007/0105567 A1 May 10, 2007

(51) Int. Cl.
*H04W 68/00* (2009.01)
*H04W 4/00* (2009.01)

(52) U.S. Cl. .................................. 455/458; 455/461
(58) Field of Classification Search ............ 455/436, 455/422, 435, 403, 550.1, 561, 458
See application file for complete search history.

(56) References Cited

U.S. PATENT DOCUMENTS

| | | | | |
|---|---|---|---|---|
| 6,697,651 | B2 * | 2/2004 | Li | 455/574 |
| 6,707,809 | B1 * | 3/2004 | Warrier et al. | 370/351 |
| 6,990,337 | B2 * | 1/2006 | O'Neill et al. | 455/422.1 |
| 7,142,520 | B1 * | 11/2006 | Haverinen et al. | 370/311 |
| 7,369,522 | B1 * | 5/2008 | Soininen et al. | 370/328 |
| 2001/0041571 | A1 | 11/2001 | Yuan | |
| 2003/0135626 | A1 | 7/2003 | Ray et al. | |
| 2004/0052238 | A1 | 3/2004 | Borella et al. | |
| 2005/0073969 | A1 * | 4/2005 | Hart et al. | 370/318 |
| 2005/0141464 | A1 * | 6/2005 | Willey et al. | 370/337 |
| 2006/0009241 | A1 * | 1/2006 | Ryu et al. | 455/458 |
| 2006/0099972 | A1 * | 5/2006 | Nair et al. | 455/458 |
| 2006/0099973 | A1 * | 5/2006 | Nair et al. | 455/461 |
| 2007/0082683 | A1 * | 4/2007 | Na et al. | 455/456.1 |

FOREIGN PATENT DOCUMENTS

| | | |
|---|---|---|
| EP | 1571785 A2 | 9/2005 |
| EP | 1655985 A2 | 10/2005 |
| WO | 0105171 A1 | 1/2001 |
| WO | 0197549 A1 | 12/2001 |
| WO | 2004070989 A2 | 1/2004 |
| WO | 2007056515 A2 | 5/2007 |
| WO | 2007056515 A3 | 5/2007 |

OTHER PUBLICATIONS

Choi, T. et al., "Combinatorial Mobile IP: A New Efficient Mobility Management Using MinimizedPaging and Local Registration in Mobile IP Enivornment", Wireless Network, 10(3), (May 3, 2004), 311-321.

(Continued)

*Primary Examiner* — Yuwen Pan
*Assistant Examiner* — Ayodeji Ayotunde
(74) *Attorney, Agent, or Firm* — Kacvinsky Daisak, PLLC

(57) ABSTRACT

Systems and techniques to manage location management and paging operations for idle mode mobile stations are described. An apparatus may comprise a first foreign agent having a foreign agent idle mode manager to store idle mode information for an idle mobile station in a first paging area of a wireless network. Other embodiments are described and claimed.

18 Claims, 8 Drawing Sheets